Jan. 17, 1950 B. A. WALLACE 2,495,191

STRING-OF-EXCHANGES TELEPHONE SYSTEM

Filed Aug. 2, 1946 4 Sheets-Sheet 1

INVENTOR:
BERT A. WALLACE
BY C. P. Soper
ATTORNEY

Jan. 17, 1950 B. A. WALLACE 2,495,191

STRING-OF-EXCHANGES TELEPHONE SYSTEM

Filed Aug. 2, 1946 4 Sheets-Sheet 2

RURAL INTERMEDIATE EXCHANGE, R1

INVENTOR:
BERT A. WALLACE
BY C. P. Sofer
ATTORNEY

RURAL TERMINATING EXCHANGE, RT

INVENTOR:
BERT A. WALLACE
BY [signature]
ATTORNEY

Jan. 17, 1950 B. A. WALLACE 2,495,191

STRING-OF-EXCHANGES TELEPHONE SYSTEM

Filed Aug. 2, 1946 4 Sheets-Sheet 4

INVENTOR:
BERT A. WALLACE
BY C. D. Soper
ATTORNEY

Patented Jan. 17, 1950 2,495,191

UNITED STATES PATENT OFFICE 2,495,191

STRING-OF-EXCHANGES TELEPHONE SYSTEM

Bert A. Wallace, Chicago, Ill., assignor to Kellogg Switchboard and Supply Company, Chicago, Ill., a corporation of Illinois Application August 2, 1946, Serial No. 688,037

13 Claims. (Cl. 179—27)

This invention relates to string-of-exchanges telephone systems. Its general object is to provide new and improved signalling arrangements for use in a system wherein three or more telephone exchanges are served by a group of common trunk lines.

GENERAL DESCRIPTION

It has been chosen to disclose the invention as applied to a system wherein two or more tandem-related automatic exchanges, termed rural exchanges, are served by common trunk lines extending thereto from a further exchange, termed a main exchange, serving as the toll centre for the concerned area, and wherein interchange connections involving any one of the rural exchanges are handled on a tool basis by an operator in the main exchange.

Features of the disclosed system include the provision that seizure of an idle one of the common trunk lines at any exchange guards it against further seizure at all exchanges, and the further provision that the signalling apparatus in the main exchange is so controlled from the rural exchanges as to give the operator the calling-signal and supervisory-signal indications customarily employed in common-battery manual practice.

Other objects and features of the invention will become more apparent as the description progresses.

Figs. 1 to 3 of the accompanying drawings show apparatus located respectively in the main exchange M, in a rural automatic exchange R1 occupying an intermediate position along the group of common trunk lines, and in rural automatic exchange RT whereat the common trunk lines terminate; Fig. 4 shows a modified arrangement for use in the main exchange and in the intermediate exchanges; and Fig. 5 is a schematic diagram showing the group of common trunk lines TL extending from main exchange M to the terminating rural exchange RT, by way of intermediate rural exchanges including R1 and R2.

As previously indicated, calls local to any rural exchange are handled in the usual manner through the automatic switching apparatus therein, while all interexchange calls including any one of the rural exchanges, whether from one rural exchange to another, or to or from a line of the main exchange, or beyond, are handled over one or another of the common trunk lines TL by an operator in the main exchange.

An interexchange arrangement of the type under discussion is of particular utility in a telephone system serving small communities, villages, and the like, located a few miles apart and comparatively near a larger community or city whereat the main exchange is located. A multi-exchange system of this general type is discussed on page 190 of "Automatic Telephone Systems," by William Aitken; Van Nostrand Co., 1923.

In the system herein illustrated, each rural exchange may have a nominal capacity of 100 lines, and employs finder-connector links for interconnecting local lines with each other and with the common trunk lines.

It has been chosen to illustrate the invention as applied to a system of the foregoing character wherein the common trunk lines are provided respectively with superimposed differential-duplex telegraph circuits, for carrying the signals necessary for the intended operation. Only one of the trunk lines TL of Fig. 4 is shown in the circuit drawings (Figs. 1 to 3), but it has been chosen to illustrate circuit apparatus associated with this trunk line suitable for use when two pairs of conductors are employed in the well-known phantom arrangement to provide three trunk lines (the two so-called side circuits and the so-called phantom circuit). In such an arrangement, so-called composite telegraph circuits are superimposed on three of the four physical talking conductors to provide individual duplex telegraph lines for the three trunk lines.

The toll line TL illustrated in Figs. 1 to 3 is carried over one of the side circuits of the three-circuit combination, while conductors 124 at repeating coil 118, 224 at repeating coil 218, and 324 at repeating coil 318, represent the neutral connections to such side circuit in the three illustrated exchanges for one side of the phantom trunk line.

In the main exchange (Fig. 1), the terminating equipment for the toll line TL includes a pair of condensers 121 for separating the conductors 123 from each other incident to derivation of the two composite telegraph circuits thereover, isolating repeating coil 118, retard coils 119, anti-thump condensers 120, the terminating differential-duplex telegraph repeater R100, and jack J2.

The illustrated main-exchange equipment further includes calling device CD which can be connected with the terminating repeater R100 of any of the common trunk lines (as by way of the key K individual to the illustrated trunk line TL) and includes the manual common-battery line circuit LC and jack J1 for the line of manual substation 100, and the operator's common-battery cord circuit CC, having its plugs P1 and P2.

The equipment shown in Fig. 2 for the rural intermediate exchange R1 includes parts 219 to 221 (and 219' to 221') corresponding respectively to parts 119 to 121 of Fig. 1; the intermediate differential-duplex telegraph repeater R200; local repeater R225 and associated exchange selector S200; finder F200 and connector C200 which may complete a connection to the line of local station 1331; finder F250 and connector C350 which may complete a connection from local station 1341 to the trunk line TL by way of branch 249; and repeater R250 associated with branch 249.

The items of circuit apparatus shown in Fig. 3 for the rural terminating exchange RT are generally duplicates of corresponding apparatus illustrated in Fig. 2, except that the terminating differential-duplex telegraph repeater R300 is much simpler than repeater R200 of Fig. 2, and more nearly resembles repeater R100 (Fig. 1) in the main exchange.

Selectors S200 and S300 may be of a simple, single-motion, step-by-step type, employing a stepping magnet (246, 346) to advance a set of brushes (248, 348), and employing a release magnet (247, 347) to return the brush set to normal position.

DETAILED DESCRIPTION

Figure 1:
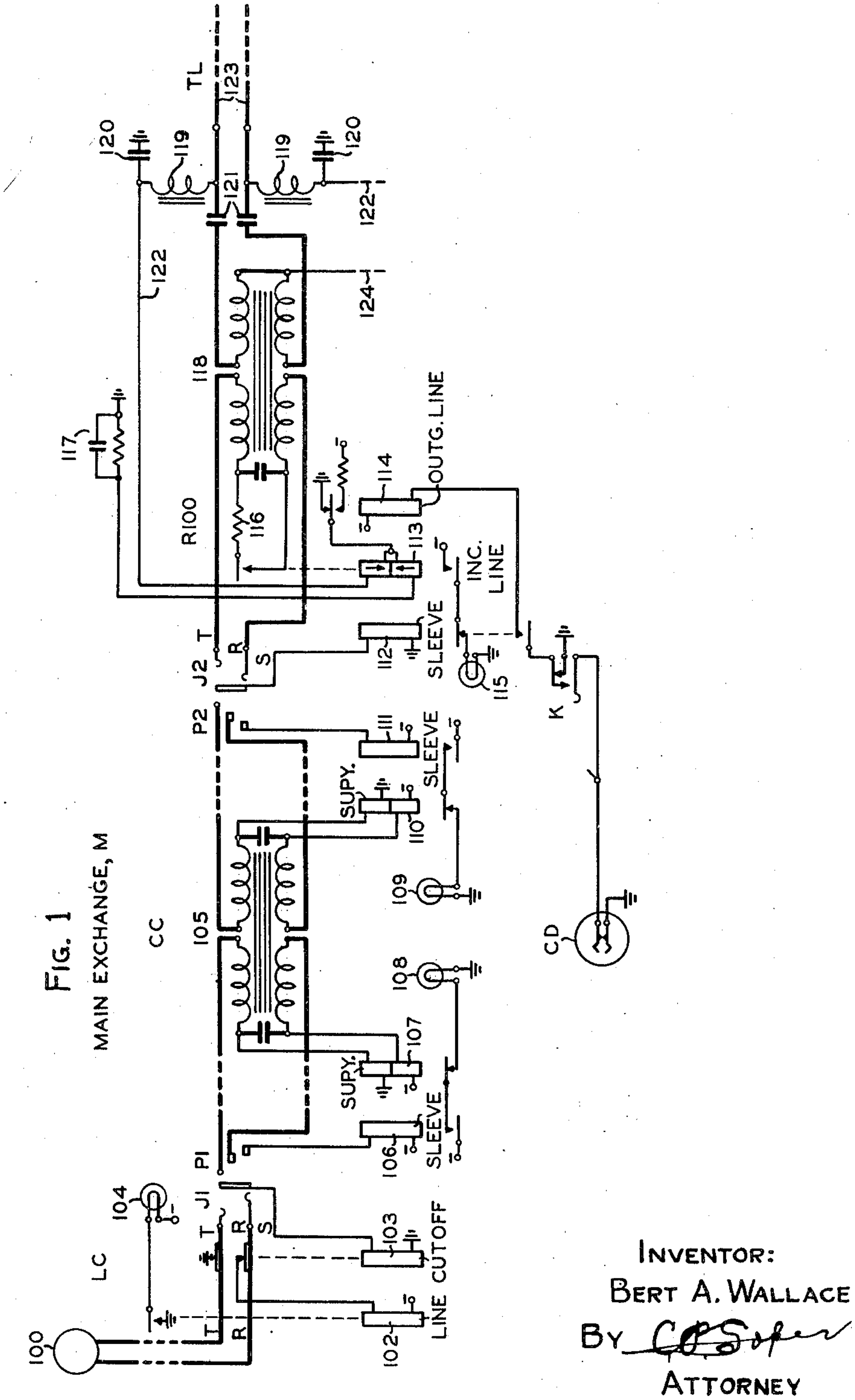

The invention having been described generally, a detailed describtion of the operation of the illustrated apparatus will now be given.

A. *Main exchange to rural exchange*

The operations involved on a call through the main exchange to a rural exchange will first be described. For this purpose, it may be assumed that the subscriber at substation 100, Fig. 1, desires to converse with the subscriber at station 0331 of the rural terminating exchange RT, Fig. 3.

Removal of the receiver (not shown) at substation 100 results in the usual operation of line relay 102 to light line lamp 104. The operator may answer the call by inserting the plug P1 of idle cord circuit CC into jack J1. When this occurs, cut-off relay 103 and sleeve relay 106 operate in series. Line relay 102 responsively restores to extinguish line lamp 104. Sleeve relay 106 closes a point in the circuit of answering supervisory lamp 108, but this lamp remains extinguished because supervisory relay 107 operates over the calling line through the left-hand windings of repeating coil 105.

It will be observed that cord circuit CC is only fragmentarily shown, the usual keys being omitted, including the ringing and listening keys.

The operator may now converse with the calling subscriber in the usual manner. Upon ascertaining the destination of the call, the operator may insert plug P2 into the jack of an idle trunk line extending in common to the rural exchanges, the jack J2 of the illustrated trunk line TL for example. When this occurs, sleeve relays 111 and 112 operate in series. Relay 111 lights calling supervisory lamp 109 in the cord circuit CC.

The expressions Outgoing and Incoming as used herein are applied to the items of apparatus to indicate direction of operation or control from the standpoint of main exchange. For example, repeater R225 is termed an outgoing repeater because it handles calls outgoing (in a control sense) from the main exchange to a rural exchange and repeater R250 is termed an incoming repeater because it functions on calls incoming (in a control sense) from a rural exchange to the main exchange.

In the terminating telegraph repeater R100, sleeve relay 112 disconnects line lamp 115 and operates outgoing line relay 114 through the normally closed contacts of key K.

Upon operating, outgoing line relay 114 disconnects the main exchange end of the first section of the associated differential-duplex telegraph line from ground and connects it to the ungrounded pole of the exchange battery by way of the adapting resistor 115. By this operation, negative "spacing" potential is substituted for the normal "marking" ground potential. Thereupon, spacing current flows through both windings of incoming line relay 113 in parallel. Being differentially connected, relay 113 is not operated by this locally applied flow of spacing current.

The flow of current through the lower winding of line relay 113 is to ground by way of balancing artificial line 117, illustrated as a resistor and a condenser in parallel. The flow of current through the upper winding of relay 113 is by way of derived telegraph leg 123, retard coil 119 of the local filter arrangement including antithump condenser 120, the upper one of conductors 123, retard coil 219, derived telegraph leg 222, lower winding of outgoing relay 231 of repeater R200, and thence to ground through contacts of line relays 234 and 235. Line relay 231 operates as a result of current flow through its lower winding alone, operating outgoing repeating relay 232.

At its lower contacts, outgoing repeating relay 232 operates line relay 241 of outgoing repeater R225. Release relay 242 is operated by line relay 241. Among other things, it grounds sleeve conductor S of incoming branch 249 of the common trunk line in use, thereby guarding the common trunk line against seizure at intermediate exchange R1.

In the repeater R200, outgoing repeating relay R232 also operates slow restoring outgoing hold relay 233 for a purpose which will appear hereinafter. At its upper armature, relay 232 switches over the second section of the associated telegraph line from its normal marking condition to spacing condition, thereby supplying current to the two windings of differential incoming line relay 235 in parallel, wherefore relay 235 is not operated. The circuit path for the upper winding of relay 235 includes the balancing artificial line 236 (similar to artificial lines 117, 217 and 317). The circuit for the lower winding of relay 235 is by way of the local telegraph leg 237, retard coil 219, and thence by way of the upper conductor 223 to ground through apparatus in intermediate exchange R2, Fig. 4 (not shown in the circuit drawings), including parts similar to 219 and 231.

Operations occur in intermediate exchange R2 as described above for intermediate exchange R1. These operations include the guarding of the common trunk line in intermediate exchange R2 and the relaying of the spacing telegraph signal to the next succeeding rural exchange. Such signal is further repeated until it reaches rural terminating exchange R3 of Fig. 3, wherein the telegraph circuit is completed to ground over the upper retard coil 319, local telegraph leg 320, the lower winding of outgoing line relay R300, and contacts of relay 334.

Relay 331 of the terminating telegraph repeater R300 now operates to bring about the successive operation of line and release relays 341 and 342 of outgoing repeater R325, and the latter relay grounds sleeve conductor S of incoming branch 349 of the common trunk line, thereby guarding such trunk line against seizure at the terminating exchange.

As a result of the above-described operations, occurring responsive to the insertion of the plug P2 into the jack J2, the associated common trunk line has been guarded at each of the rural exchanges to which it extends, and the exchange selectors (such as S200 of Fig. 2 and S300 of Fig. 3) have been prepared for operation.

Figure 3:
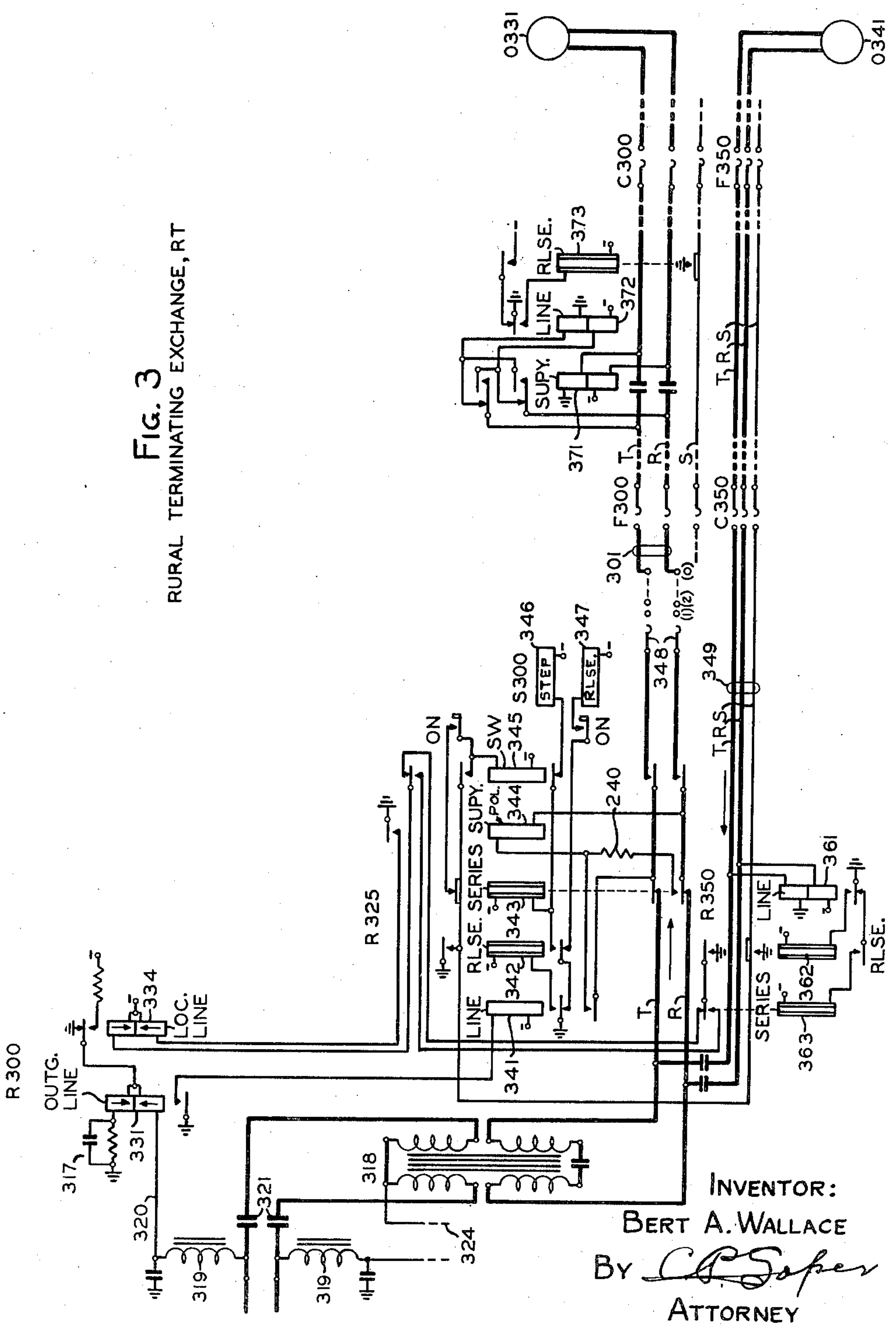

In order to complete the connection to the desired telephone station 0331, Fig. 3, the operator actuates key K to associate her calling device CD individually with the concerned common trunk line, and then manipulates the calling device in accordance with the digits in the desired telephone number. Operation of key K transfers the circuit of the operated outgoing line relay 114 to ground through calling device CD.

The first digit to be dialed by the operator is a digit indicative of the desired exchange. In the present example, the desired exchange is the terminating exchange RT of Figs. 3 and 4, to which the exchange digit 0 is assigned. Accordingly, the operator first manipulates the calling device CD to produce ten momentary circuit interruptions representing the exchange digit 0. Accordingly, outgoing line relay 114 is restored ten times momentarily. Upon each momentary restoration, line relay 114 momentarily returns the associated telegraph line from spacing condition to marking condition. The current flow over the associated section of the telegraph line, and over the artificial line 117, is accordingly interrupted momentarily ten times.

As a result, outgoing line relay 251 in the repeater R200 restores ten times momentarily, which action is repeated by outgoing repeating relay 232. Slow-restoring outgoing hold relay 233 does not respond to the action of outgoing repeating relay 232 because of the momentary nature of the interruption impulses occasioning the series of restorations of relay 232. At its upper armature, relay 232 repeats the ten momentary marking impulses to the next section of the telegraph line, with the result that they finally reach outgoing line relay 331 in the rural terminating exchange, which line relay is restored momentarily ten times.

Figure 2:
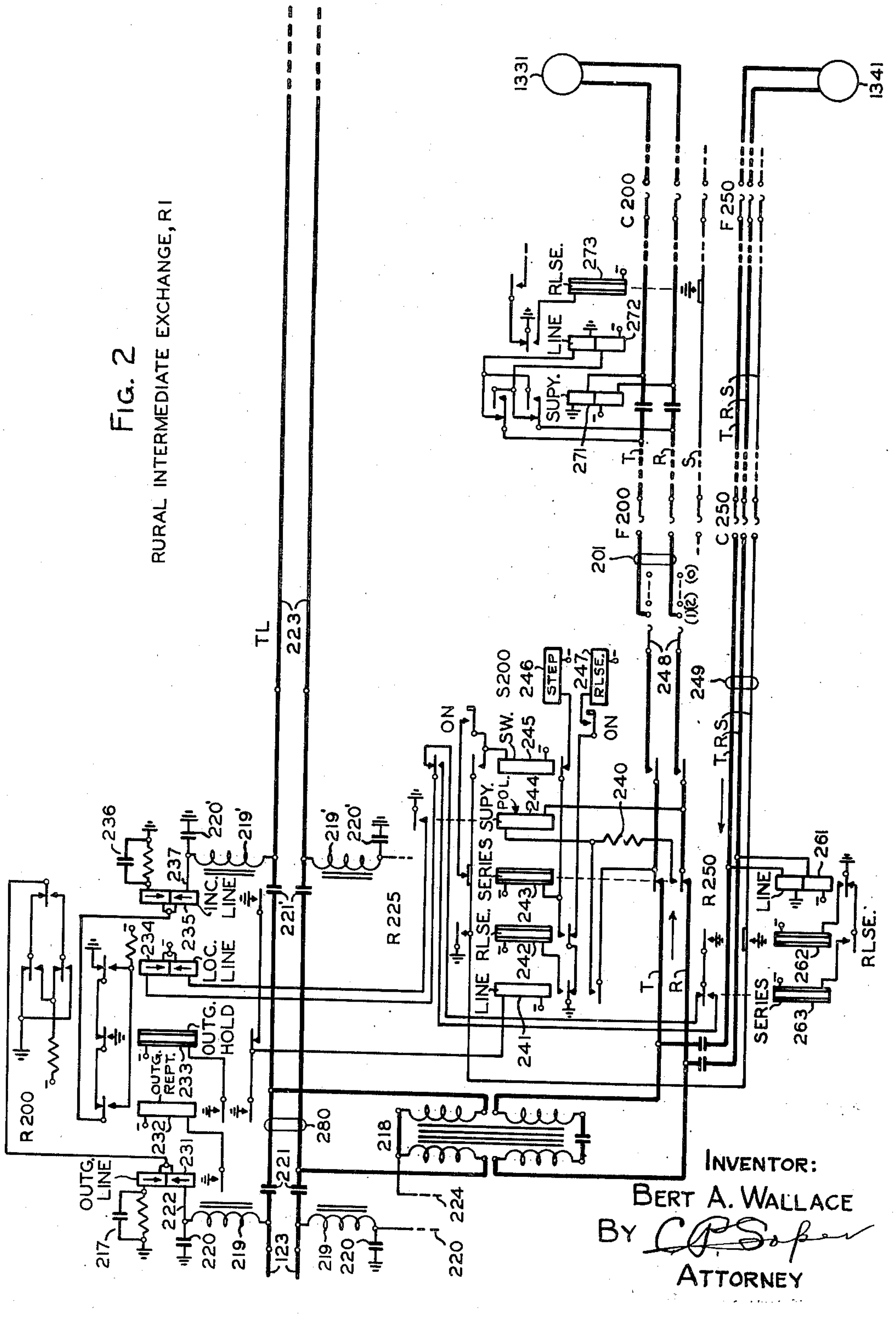

In exchange R1 of Fig. 2, line relay 241 is restored momentarily ten times by outgoing repeating relay 232, the slow-restoring release relay 242 remaining operated. Upon each restoration of line relay 241, an impulse is delivered to stepping magnet 246 through the back contact of the inner armature of line relay 241, and the front contact of the lower armature of the operated release relay 242. Stepping magnet 246 is accordingly energized ten times to advance brushes 248 ten steps from their illustrated normal position. The brushes are therefore advanced to the tenth set of bank contacts (0) corresponding to the rural terminating exchange. These contacts are left disconnected in all rural exchanges except in the rural terminating exchange RT.

Impulse-series relay 243, connected in parallel with stepping magnet 246, operates responsive to the first impulse of the series and remains operated throughout the series of impulses, being slow restoring as indicated.

Both pairs of off-normal contacts ON associated with selector S200 close on the first step of the brushes 248 from their normal position and remain closed thereafter until the selector is returned to its normal position.

When series relay 243 restores at the end of the series of impulses, switching relay 245 operates through the upper contacts of relays 242 and 243, and through the upper pair of off-normal contacts ON. Upon operating, relay 245 locks itself, at its inner upper contacts, to ground through contacts of release relay 242; disconnects stepping magnet 246, at its inner lower contacts, to prevent impulses transmitted incident to the dialing of further digits from effecting the selector; and performs other switching operations which are of no consequence except in the selected exchange.

Similar operations occur in each other one of the rural exchanges, the exchange selector in each being set to the tenth position corresponding to the called terminating exchange RT.

In the terminating exchange, stepping magnet 346 of the selector S300 responds to the action of the line relay 341 as described for parts 241 and 246, advancing brushes 348 to the tenth set of contacts (0), which are connected in the terminating exchange. Switching relay 345 operates as described for relay 245.

In addition to locking itself directly to the upper contacts of relay 342 and disconnecting stepping magnet 346, relay 345 places a bridge across brushes 348, which includes the winding of polarized supervisory relay 344 and the lower contacts of line relay 341. As a result, a bridged, calling condition is placed on the conductor pair 301, extending from the connected tenth contact set (0) to the bank of finders such as F300. A line circuit (not shown) of the type ordinarily employed for subscriber lines and comprising a line relay and a cut-off relay, corresponding generally to relays 102 and 103 of line circuit LC, Fig. 1, may be associated with conductors 301 and the associated terminals in the finder bank. Accordingly, the described bridging of conductors 301 results in the operation of an idle finder, F300 for example, to make connections therewith.

Finder F300 is illustrated as linked with connector C300, having the usual control relays, of which relays 371 to 373 are shown. When finder F300 is set onto conductors 301 responsive to the described bridging thereof, line relay 372 operates over the bridged conductors 301 in series with the winding of polarized supervisory relay 344. Relay 344 does not operate at this time. Line relay 372 brings about the operation of the associated release relay 373 to ground the associated sleeve conductor S and to prepare the connector C300 for operation in response to the remaining digits in the desired number.

When the operator manipulates the calling device CD in accordance with the remaining digits (3, 3, and 1) in the desired number, corresponding series of impulses are transmitted over the tandem-related sections of the telegraph line. These additional impulses are responded to by line relay 241 in intermediate exchange R1, by the corresponding line relays in the remaining intermediate exchanges, and by line relay 341 in terminating exchange RT, but no particular result is produced in any exchange except in the selected terminating exchange RT. For example, in intermediate exchange R1, line relay 241 causes series relay 243 to operate, but produces no other result as the brushes 248 have been set on contacts which are locally unwired.

In the terminating exchange RT, line relay 341 restores momentarily as a result of each impulse of each of the succeeding digits. At its lower contact pair, it momentarily interrupts the bridge across conductors 301 each time it restores, causing line relay 372 of the connector C300 to respond. Series relay 343 operates at the beginning of each additional series of impulses dialed and remains operated to the end thereof, but stepping magnet 346 gives no further response as it is disconnected at the inner lower contacts of the operating switching relay 345.

Upon operating on the first impulse of any further digit, series relay 343 disconnects the tip and ring conductors extending forward from repeating coil 318, to eliminate all but the first inductive disturbance from the talking path. Additionally, relay 343 bridges resistor 240 around the winding of polarized relay 344 to reduce the inductance of the holding bridge during the impulsing operation.

The response of line relay 372 of the connector C300 to the impulse series representing the line-selecting digits 3 and 3 causes such connector to be set upon the terminals of the corresponding line in the usual manner, while the response of such line relay to the single impulse constituting the station digit 1 conditions the ringing apparatus of the connector C300 to signal the wanted station on the line as distinct from any other stations which may be connected thereto, the well-known party-line arrangement.

When the subscriber at the called station 0331 removes his receiver in response to being called, the usual tripping operation occurs to close the indicated connection. Thereupon, supervisory relay 371 operates to reverse the direction of current flow through the winding of polarized supervisory relay 344. Relay 344 thereupon operates to close a circuit for the lower winding of local line relay 334 of terminating repeater R300 to signal the operator over the incoming channel of the telegraph line that the call has been answered.

Upon operating, relay 344 disconnects the terminating section of the associated telegraph line from ground and transfers it to the ungrounded pole of the exchange battery. This constitutes replacing the normal marking condition on the inward channel by a spacing condition. This spacing signal is relayed from one intervening rural exchange to another, resulting in the operation of incoming line relay 235 of repeater R200.

Upon operating, relay 235 closes a point in a second circuit for line relay 241, but this circuit is presently being held open by the operated outgoing hold relay 233. At its upper armature, relay 235 disconnects the first section of the telegraph line from ground and transfers it to the ungrounded pole of the exchange battery, thereby repeating the spacing signal to the main exchange.

Incoming line relay 113 of the repeater R100 in the main exchange now operates. Its circuit is from battery through the front contact of relay 114, the lower winding of relay 113, and thence to ground through artificial line 117. Outgoing line relay 231 of repeater R200 is now maintained operated over a similar local circuit for its upper winding, the telegraph circuit being currentless.

At its upper contacts, relay 113 closes a supervisory bridge across the tip and ring conductors of the jack J2, including the resistor 116 and the switchboard windings of repeating coil 118. Supervisory relay 119 in the cord circuit CC now operates through the right-hand windings of repeating coil 115, thereby extinguishing supervisory lamp 109 to indicate to the operator that the call has been answered.

Conversation may now take place between the subscriber at substation 100 (Fig. 1) and the subscriber at called substation 0331 (Fig. 3) over the path indicated by the heavy talking conductors. This talking path includes repeating coils 105, 118, and 318. It further includes blocking condenser pairs 121 in the main exchange, 221 and 221′ in intermediate exchange R1, and 321 in the terminating exchange RT.

When the conversation has been completed, the replacing of the receivers at the concerned substations results in the lighting of supervisory lamps 108 and 109 of cord circuit CC as disconnect signals. The lighting of lamp 108 occurs directly as the result of the restoration of supervisory relay 107 with sleeve relay 106 operated. The lighting of lamp 109 as a disconnect signal results directly from the restoration of supervisory relay 119 with sleeve relay 111 operated, which restoration results indirectly from the replacement of the receiver at called substation 0331. More particularly, replacing of the receiver at station 0331 causes supervisory relay 371 to restore, which in turn causes polarized supervisory relay 344 to restore by returning the direction of current flow therethrough to normal. Relay 344 open-circuits and restores local line relay 334 of telegraph repeater R300. The terminating section of the associated telegraph line is thereby returned to its normal inward marking condition, which is repeated through the intervening rural exchanges to the intermediate exchange R1, whereat incoming relay 235 restores and regrounds the first section of the telegraph line, whereupon incoming line relay 113 of the repeater R100 restores to open circuit and restore supervisory relay 110.

If, instead of replacing the receiver, the subscriber at the called station 0331 desires to attract the operator's attention, he may do so by opening his hookswitch (not shown) a number of times momentarily. For each momentary opening of the hookswitch, lamp 109 is lighted as previously described, and is extinguished as previously described when the hookswitch is allowed to reclose the called line. This operation is customarily termed flashing.

Assuming that both subscribers have replaced their receivers, to cause lamps 108 and 109 to glow steadily as described, the operator at the main exchange may now take down the connection by removing plugs P1 and P2 of the cord circuit CC. The resultant restoration of sleeve relays 106 and 111 extinguishes lamps 108 and 109, while the restoration of cut-off relay 103 returns the manual line circuit LC to normal condition.

The restoration of sleeve relay 112, upon the removal of the plug from jack J2, open-circuits and restores outgoing line relay 114, which returns the outgoing channel of the first section of the telegraph line to its normal grounded marking condition, thereby restoring outgoing line relay 231 of repeater R200. Outgoing repeating relay 232 open-circuits and restores line circuit 331 of repeater 225, causing an incidental momentary operation of series relay 243. Release relay 242 restores after an interval and ungrounds the sleeve conductor S of the local branch 249 of the common trunk line thereby marking the trunk line as idle in intermediate exchange R1. Additionally, relay 242 open-circuits and restores switching relay 245, which disconnects brushes 248 and closes a circuit for release magnet 247, through the lower set of off-normal contacts ON, whereupon magnet 247 returns brushes 248 to their normal position in the usual manner.

In the repeater R200, the continued restoration of outgoing repeating relay 332 permits outgoing hold relay 333 to restore after an interval, completely clearing out the apparatus in exchange R1.

The upper armature of outgoing repeating relay 332 repeats the normal marking telegraph condition to the next succeeding rural exchange, with the result that it reaches the terminating exchange RT, whereat outgoing line relay 331 responsively restores.

In the repeater R325, line relay 341 now restores, causing an incidental temporary operation of series relay 343. After a slight interval, release relay 242 restores to remove the guarding ground potential from the sleeve conductor 344 and to permit switching relay 345 to restore. The selector S300 is cleared out as described for the selector S200.

The described restoration of line relay 341 opens the bridge across conductors 301 and thereby open-circuits and restores line relay 372. This is followed a moment later by the restoration of release relay 373 to clear out the connection through finder F300 and connector C300 in the usual manner.

B. *Rural exchange to main exchange*

In order to explain how connections from rural-exchange subscribers are completed to, or through, the main exchange, it may be assumed that the subscriber at substation 0341 (Fig. 3) in terminating exchange RT desires to converse with the subscriber at substation 100 (Fig. 1) in the main exchange.

Responsive to the removal of the receiver at the calling substation 0341, an idle finder such as F350 is set upon the terminals of the calling line in the usual manner, thereby extending the calling line to the interlinked connector C350.

Responsive to the dialing of the designation of the main exchange, connector C350 sets itself on the terminals of an idle one of the common interexchange trunk lines TL and switches the conductors of the calling line through thereto. It may be assumed that the illustrated trunk line TL of Figs. 1 to 3 is idle at this time, which condition is indicated by the absence of a guarding ground potential of sleeve conductor S of its incoming branch 349, and that such trunk line is seized, by way of branch 349.

Line relay 361 of the repeater R350 now operates over the calling line, release relay 362 operating responsive thereto. At its inner contacts, relay 362 grounds the associated sleeve conductor, thereby marking the trunk line engaged, and closing a holding circuit (not shown) for switches C350 and F350.

At its upper contacts, release relay 362 closes a circuit for the upper winding of local line relay 334 of the repeater R300, by way of back contacts of relays 363 and 345. Relay 334 now operates to substitute a spacing potential for the marking potential normally applied to the associated section of telegraph line, causing the incoming line relay (not shown) in the adjacent rural exchange to operate and repeat the spacing condition to the next succeeding rural exchange.

When the applied spacing condition is repeated to exchange R1, incoming line relay 335 therein operates to repeat at its upper armature, the spacing condition to the section of the telegraph line extending to the main exchange. At its lower armature, relay 235 operates line relay 241 of repeater R225, through contacts of outgoing hold relay 233. The operation of line relay 241 is followed by the operation of release relay 242 to prepare the associated selector S200 for operation and to guard local branch 249 of the trunk line by applying ground potential to the sleeve conductor thereof. Similar operations occur in the exchanges intervening between R1 and RT, with the result that the seized common trunk line is guarded in each of the rural automatic exchanges.

In the main exchange, incoming line relay 113 responds to the spacing signal by lighting line lamp 115 through contacts of sleeve relay 112.

The operator in the main exchange may now answer the call by inserting the plug of an idle cord circuit into the jack J2, thereby operating sleeve relay 112 to extinguish lamp 115. Additionally, relay 112 operates outgoing line relay 114 through contacts of key K to place a spacing condition on the outgoing channel of the associated telegraph line, thereby operating outgoing line relay 231 of repeater R200 in exchange R1. Relays 232 and 233 operate successively responsive to the operation of the relay 231. Relay 232 closes a new circuit for the operated line relay of repeater R225, while relay 233 removes line relay 241 from under the control of incoming line relay 235.

Outgoing repeating relay 232, at its upper armature, substitutes spacing potential for marking potential on the associated end of the next succeeding section of the telegraph line, thereby causing relay operations as previously described to occur in the next succeeding rural exchange, resulting finally in the operation of outgoing line relay R331 in the terminating exchange, followed by the operation successively of relays 341 and 342 to prepare the selector S300 for operation responsive to an exchange selecting digit in the event that the instant call is for a line of one of the rural exchanges.

The operator in the main exchange may now complete the connection to the line of called station 100 in the usual manner, using the other plug of the cord circuit. Assuming that the cord circuit employed is the one shown at CC, and that the answering plug is P2, the connection is completed by inserting plug P1 into jack J1, causing relays 103 and 106 to operate as described.

Supervisory lamp 108 lights through contacts of sleeve relay 106 and remains lighted as a calling supervisory signal until the called subscriber answers. It may be recalled that apparatus such as the ringing keys and their associated connections have been omitted from cord circuit CC to simplify the disclosure.

Answering supervisory lamp 109 of the cord circuit CC is not lighted at this time because its circuit is held open by supervisory relay 110, operated through contacts of the operated incoming line relay 113.

When the two subscribers have finished their conversation, lamps 108 and 109 become lighted as respective disconnect signals responsive to the restoration of the receivers at the two stations.

Restoration of the receiver at calling substation 0341, causes restoration of line relay 361, succeeded by the restoration of slow-restoring relay 362. Impulse-series relay 363 operates responsive to a temporary circuit closed by the line relay and opened by the release relay. The circuit of local line relay 334 of telegraph repeater R300 is opened initially at the back contact of series relay 363, and then at the upper contacts of release relay 362. Upon restoring, local line relay 334 replaces marking ground potential on the associated section of the telegraph line, which condition is repeated to reach repeater R200, whereat incoming line relay 235 responsively restores. Its restoration, however, does not affect line relay 241 which is held operated by outgoing repeating relay 232.

The replacement of marking potential on the incoming end of the first section of the telegraph line, by the upper armature of relay 235, results in the restoration of incoming line relay 113 to restore supervisory relay 110, and thereby light supervisory lamp 109 as a disconnect signal.

If the calling subescriber at substation 0341 wishes merely to recall the operator at the main exchange, as distinct from having the connection taken down, he may cause the lamp 109 to flash one or more times by correspondingly depressing his usual hookswitch one or more times rather than by replacing his receiver. Under this condition, the described operations of relays 361 to 363 is followed in each case by a reoperation of relays 361 and 362, and the latter relay reoperates local line relay 334 to restore the inward telegraph channel to spacing condition, causing supervisory relay 110 to reoperate and extinguish the momentarily lighted lamp 109.

During this flashing recall operation, the connection through switches F350 and C350 is maintained by the ground potential applied to sleeve conductor S of branch 349 by release relay 342, controlled over the telegraph channel from the main exchange, by line relay 341. Additionally, the guarding potential is maintained on the common trunk line at each of the intermediate exchanges. For example, in the exchange R1, Fig. 2, relays 241 and 242 are held operated by outgoing repeating relay 332, and a guarding ground potential is thereby held on sleeve conductor S of local branch 249.

Assuming now that the receivers have been replaced at both substations to bring about described steady lighting of lamps 108 and 109, the operator may take down the connection. The consequent restoration of sleeve relay 112 permits outgoing line relay 114 to restore and replace normal outward marking potential on the associated telegraph line, causing the described repeating operations to occur which result finally in the restoration of outgoing line relay 331.

In the first intermediate exchange R1, the restoration of relay 231 causes relays 232 and 233 to restore successively. Relays 241 and 242 restore successively responsive to the restoration of relay 232, and relay 242 removes the guarding potential from the sleeve conductor of incoming branch 249 of the common trunk line.

In the terminating exchange RT, relays 341 and 342 restore successively responsive to the restoration of relay 331, and relay 342 removes the holding and guarding potential from conductors S of branch 349, which renders the common trunk line available again to switches in the terminating exchange and permits switches C350 and F350 to clear out in the usual manner.

Incidental to the described clearing-out operation, switches S200 and S300 each take a single step when the associated line relay restores, but return to normal position when the associated slow-restoring release relay (242, 342) restores.

C. *Final rural exchange to first rural exchange*

In order to explain how connections from one rural exchange to another are completed, it will be assumed that the subscriber at station 0341 in the terminating exchange RT desires to converse with the subscriber at station 1331 of the first rural exchange R1.

For this purpose, the subscriber at the calling substation 0341 removes his receiver and dials the designation of the main exchange and informs the main exchange operator of the identity of the called line.

It may be assumed that finder F350 responds as previously described to connect the calling line to connector C350 upon the removal of the receiver. Dialing of the designation of the main exchange causes the connector C350 to operate as previously described to seize an idle common trunk line. Assuming the trunk line seized to be the one illustrated in the drawings, it is seized over branch 349, causing operations as previously described to occur which culminate in the lighting of line lamp 115. At this time, relays 361 and 362 are energized in repeater R350; relay 334 is energized in repeater R300; relay 235 is energized in repeater R200; relays 241 and 242 are energized in repeater R225; and relay 113 is energized in repeater R100.

When the operator inserts the plug of the cord circuit in the jack J2 to answer the call, the resulting operation of sleeve relay 112 extinguishes line lamp 115 and initiates the previously described succession of relay operations. This includes the operation of relay 114 in repeater 100, the operation of relays 231 to 233 in repeater R200, the operation of relay 331 in repeater R300, and the operations of relays 341 and 342 in repeater R325.

Upon ascertaining the number of the called substation, the operator manipulates key K to associate calling device CD with repeater R100, and then dials the number of the called station, comprising exchange digit 1, tens digit 3, units digit 3, and station digit 1.

Responsive to the dialing of the exchange digit 1, outgoing line relay 114 is restored once momentarily, bringing about a momentary restoration of relays 231 and 232 in repeater R200, relay 331 in repeater R300, and of line relays 241 and 341 of repeaters R225 and R325. Selectors S200 and S300 (together with the selectors at the other rural exchanges not illustrated) respond as previously described to advance brushes 248 and 348 to the position corresponding to the called exchange. In the present example, wherein the first exchange R1 is called, the selectors are advanced a single step responsive to the single impulse constituting the exchange digit. All selectors except S200 arrive on disconnected contacts, but selector S200 arrives on its connected first set (1) from which conductors 201 extend to contacts in the bank of finder F200. Series relays 243 and 343 operate in conjunction with the off-normal contacts of their respective selectors to bring about the described operation of switching relays 245 and 345 at the end of the exchange digit.

In the called intermediate exchange R1, the operation of switching relay 245 results in the bridging of conductors 201 to cause a finder such as F200 to make connection therewith, whereupon relays 272 and 273 of the associated connector C200 operate to prepare the connector for operation in response to the remaining digits on the number.

In the calling rural exchange RT, the operation of switching relay 345 results in the opening, at the back contact of its upper armature, of the energizing circuit of local line relay 334. When this occurs, line relays 334, 235, and 113 restore successively. At its upper contacts, relay 113 open-circuits supervisory relay 110 in cord circuit CC (assuming that plug P2 was used to answer the call), lighting lamp 109 through contacts of sleeve relay 111 to give the operator an unanswered supervisory signal. The further progress of the connection is accordingly under the same supervisory-signal conditions as obtained when the operator is contemplating a connection as previously described to one of the rural exchanges originated at the main exchange, or at some point beyond.

Responsive to the dialing of the tens and units digits 3 and 3, the connector C200 is set upon the terminals of the line of the called substation 1331, the controlling impulses being repeated by the lower contacts of line relay 241, into the bridge across conductors 201, through contacts of the operated relay 246 and brushes 248. Series relay 243 responds during each impulse series, as explained hereinbefore for relay 343, and shunts resistor 240 around the winding of supervisory relay 244 to improve the impulsing circuit for the connector.

Responsive to the dialing of the station digit 1, the called station on the called line is selected and is signaled in the usual manner.

When the call is answered, the resulting operation of supervisory relay 271 causes polarized supervisory relay 244 to operate and close an operating circuit for local line relay 234. Upon operating, line relay 234 switches over the local end of the first section of the telegraph line from its normal marking condition to spacing condition, reoperating relay 113. Supervisory relay 110 responsively reoperates to extinguish lamp 109 to signal the operator that the call has been answered.

Since its inner upper armature is disconnected, at the back contact of outgoing hold relay 233, local line relay 234 exercises no control at this time over the outgoing channel of the telegraph line.

The middle armature and the outer armature of relay 234, together with their back and front contacts, comprise a reversing switch with respect to the connections between the contacts of the upper armature of line relay 235 and the conductors over which negative spacing potential and marking ground potential are supplied thereto. Accordingly, relays 234 and 235 exercise dual control over the inward channel on the first section of the telegraph line. Spacing ground potential is applied thereto when both relays are restored, as well as when both are operated. Negative spacing potential is applied when either relay is operated at the time when the other is restored.

By control exercised through repeater R350, the calling subscriber may recall the operator at any time, whether the receiver at the called station is removed, or is in place. The repeater R350, however, is so arranged that the calling subscriber may not transmit dial pulses to the telegraph line to position the switching apparatus in the called exchange. This results from the fact that the control is exercised through slow-restoring relays 362 and 363, which will not follow dial pulses.

Opening the hookswitch at the calling station 0341 causes line relay 361 to restore and operate relay 363, followed a moment later by the restoration successively of slow-restoring relays 362 and 363. Reclosure of the hookswitch contacts causes relays 361 and 362 to reoperate successively.

If the described resignalling operation of relays 361 to 363 occurs before the operator has dialed the number, local line relay 334 is being held operated through the back contacts of relays 345 and 362. Consequently, relay 334 restores responsive to the temporary operation of slow-restoring relay 363, and remains restored until relay 363 has restored and relay 362 has reoperated. The consequent telegraphic signal causes relay 113 to restore temporarily to control supervisory relay 110 to flash lamp 109.

If the described resignalling operation of relays 361 to 363 occurs after the operator has dialed the exchange digit, and thereby caused switching relay 345 to operate as described to restore relay 334 to light lamp 109, then the operation of relay 363 closes a circuit for relay 334 through a front contact of relay 345. Relay 334 accordingly operates responsive to the operation of relay 363, and remains operated until relay 362 restores, thereby telegraphically controlling relay 110. If this occurs before the called subscriber answers, or after he has replaced his receiver, the then restored relay 110 is momentarily reoperated to momentarily extinguish lamp 109. On the other hand, after the called subscriber has answered, and before he has replaced his receiver, local line relay 234 of the repeater R200 is being held operated by supervisory relay 244 of repeater R225; relay 110 is operated; and lamp 109 is extinguished. Under this condition, the temporary reoperation of incoming line relay 235, responsive to the described temporary reoperation of local line relay 235, causes relays 113 and 110 to restore temporarily, temporarily relighting supervisory lamp 109.

It will be understood, of course, that a momentary response is obtained as above described at supervisory lamp 109 when the receiver is replaced at the calling substation at any time after the operator has dialed the exchange digit. The operator may disregard a single flash of a supervisory lamp such as 109, giving heed only to two or more successive flashes, such as are caused by two or more temporary openings of the hookswitch.

Release relay 342, held operated by line relay 341 as long as the operator's cord is connected with the common trunk line, holds ground potential on the sleeve conductor of branch 349 to maintain switches C350 and F350 in operated condition during the time relay 362 is restored.

When the receiver is replaced at the called substation, the consequent restoration of supervisory relay 361 causes supervisory relay 244 to restore, responsive to which local line relay 234 in the repeater R200 restores and returns the first section of the associated telegraph line to its normal marking condition. When this occurs, line relay 113 and supervisory relay 110 restore, relighting supervisory lamp 109. Reclosing of the line at the called station at any time before the connection is taken down reverses the described relay operation, to again extinguish lamp 109, as when the called subscriber actuates his hookswitch to recall the operator.

Assuming that both subscribers have replaced their receivers, and that lamp 109 is lighted steadily as a disconnect signal, the operator may remove her plug from the jack J2 to break down the connection. When this occurs, the restoration of outgoing line relay 114 reimpresses the normal marking condition on the associated telegraph line, which is repeated through repeater R200 and the other similar repeaters to reach repeater R300, line relays 231 and 331 restoring.

In the repeater R200 the restoration of line relay 231 is followed by the restoration successively of relays 232 and 233 to return the repeater to its illustrated normal condition.

In the repeater R225, relays 241 and 242 restore successively responsive to the restoration of relay 232. Relay 245 restores responsive to the restoration of release relay 242. Branch 249 of the illustrated common trunk line is rendered available to the local switches by the removal of ground potential from the sleeve conductor thereof by relay 242.

Switches F200 and C200 are cleared out in the usual manner responsive to the opening of the local contacts of line relay 241, followed a moment later by the described restoration of relays 242 and 245. Stepping switch S300 is cleared out in the previously described manner responsive to the restoration of relay 242.

In the calling exchange RT, the restoration of outgoing line relay 331 permits relays 341, 342, and 345 to restore successively. Relay 342 removes the guarding and holding ground potential from the sleeve conductor of branch 349. This operation renders the common trunk line again available to the local switches and permits switches C350 and F350 to clear out. Selector S300 clears out as previously described responsive to the restoration of relay 342.

D. *First rural exchange to final rural exchange*

In order to further explain the provisions for handling calls from one rural exchange to another, the operations involved in a call from a line of the first rural exchange R1 to a line of the final rural exchange RT will be outlined. For this purpose, it may be assumed that the subscriber at station 1331 of the first rural exchange desires to converse with the subscriber at station 0331 of the terminating rural exchange.

It may be assumed that finder F250 operates responsive to the removal of the receiver, to extend the line of calling station 1341 to connector C250, and that connector C250 finds the illustrated common trunk line idle when the designation of the main exchange is dialed, seizing such trunk line by way of branch 249, relays 261 and 262 operating.

The operation of relay 262 closes a circuit, by way of contacts of the unoperated relays 263 and 245, for local line relay 234. At its inner armature, relay 234 switches the second section of the telegraph line from its normal marking condition to spacing condition, which is repeated through the intervening rural exchanges to the terminating rural exchange, whereat outgoing line relay 331 operates. The repeater R325 is thereby prepared for operation as previously described (relays 341 and 342 operating), guarding the common trunk line from seizure in the terminating exchange. The common trunk line is similarly guarded against seizure in each intervening exchange.

By the operation of the upper armature of local line relay 234 of the repeater R200, a marking condition is transmitted over the first section of the telegraph line to operate incoming line relay 113 in the main exchange to light line lamp 115 as a calling signal.

The operator may respond to the calling signal by inserting the plug of an idle cord circuit into the jack J2 with the previously described results, including the extinguishing of line lamp 115 and the operation of outgoing line relay 114 to impress a spacing condition on the outgoing channel of the associated telegraph line.

In the repeater R200 located in the calling rural exchange, line relay 231 responds to the outgoing spacing potential to operate relays 232 and 233 successively. At its upper armature, relay 232 takes over the control of the second section of the telegraph line and makes a substitute spacing connection thereto (initially made by local line relay 234) whereby a spacing condition is maintained on the succeeding sections of the telegraph line.

At its lower contacts, relay 232 operates line relay 241, which operates release relay 242 to prepare repeater R225 and the associated selector S200 for operation. Relay 242 places an additional ground potential on the sleeve conductor S of the associated branch 249 to hold the operated switches F250 and C350 so long as the connection remains established through the jack J2 in the main exchange.

The operator may now associate her calling device CD temporarily with the illustrated common trunk line and dial the called number (0331). Operations as previously described now occur in the repeaters R225 and R325 to position the selectors S200 and S300 on the tenth (0) contact set, followed by the operation of switching relays 245 and 345.

In the called exchange RT the operation of relay 345 causes brushes 348 to be bridged through relay 344 and contacts of line relay 341, whereupon a finder such as F300 operates in the usual manner to extend the connection to a connector such as C300.

In the calling exchange, the operation of switching relay 245 serves to open-circuit and restore local line relay 234. With relays 232 and 233 operated, the marking condition imposed on the associated end of the second section of the telegraph line is not disturbed. Restoration of the upper armature of relay 234 returns the normal marking potential to the first section of the telegraph line, restoring incoming line relay 113. Assuming that it is plug P2 of the cord circuit CC which is in use, supervisory relay 110 responsively restores to light supervisory lamp 109 to give unanswered supervision to the operator.

Responsive to the dialing of the remaining digits of the number, the connector C300 is set upon the called line and applies ringing current to signal the called station.

When the call is answered, relays 371, 344, 334, 235, 113, and 110 operate, relay 110 extinguishing lamp 109 to give answered supervision.

With the connection from the calling station 1341 through switches F250 and C250 held under operator control by release relay 242, and with the connection through switches F300 and C300 held under operator control by line relay 341, either subscriber may signal the operator as described in connection with the call from exchange RT to exchange R1.

When both subscribers to the connection have replaced their receivers, lamp 109 is lighted steadily as a disconnect signal, whereupon the operator may remove her plug from the jack J2 to clear out the involved equipment and return the common trunk line to normal condition as previously described.

E. *Operator control of intra-exchange connections*

Each rural exchange is provided with circuit arrangements enabling the operator to complete locally a connection originating therein when requested to do so. In order to describe these arrangements, it may be assumed that the subscriber at substation 0341 of the terminating exchange desires to converse with the subscriber at substation 0331 of the same exchange, and desires the operator at the main exchange to set up the connection. This situation may arise when the main-exchange operator has been called for information as to the number of the called station.

It may be assumed that the calling line has been extended to the main exchange through finder F350, connector C350, and the illustrated common trunk line, and that the operator has answered the call by inserting the plug P2 into the jack J2 with results as described.

Responsive to the dialing of the exchange digit 0 in the number of the called station, the selectors such as S200 and S300 operate as previously described, and selector S300 makes connection with conductors 301 to cause an idle finder such as F300 to bring in a local connector such as C300.

Switching relay 345, on operating following the dialing of the exchange digit, restores local line relay 334 as previously described. Consequently relays 235, 113, and 110 are restored, wherefore lamp 109 is lighted to give unanswered supervision to the main-exchange operator.

Connector C300 operates in the usual manner to connect with the called line and to signal the called station 0331 thereon responsive to the dialing of the remaining digits in the called number.

When the called subscriber answers, the resulting operation of supervisory relay 371 causes polarized supervisory relay 344 to operate, operating local line relay 334 to transmit answered supervision telegraphically to the main exchange. Relays 235, 113, and 110 responsively operate, and relay 110 extinguishes supervisory lamp 109 to give answered supervision.

Either subscriber to the locally completed connection may now recall the operator by momentarily depressing his hookswitch. If the subscriber at the called station 0331 signals the operator, polarized supervisory relay 344 responds to the resulting momentary restoration of relay 371 to signal the operator through the resulting action of local line relay 334. On the other hand, if the subscriber at the calling substation momentarily depresses his hookswitch, relays 361 to 363 respond as previously described and a circuit is momentarily closed for local line relay 334 through front contacts of relays 362, 363, and 345. Local line relay 234 is differentially wound, and the lower winding is being maintained energized through contacts of polarized relay 344. Consequently, the momentary energization of the upper winding responsive to actuation of the hookswitch contacts causes relay 334 to restore momentarily and to transmit a momentary marking signal telegraphically to the main exchange, whereat relay 113 restores momentarily to cause supervisory relay 110 to momentarily extinguish supervisory lamp 109.

When both subscribers to the connection have replaced their receivers, lamp 109 glows steadily as a disconnect signal. The entire connection clears out (including finders F350 and F300 and of connectors C350 and C300) responsive to the removal of the plug from jack J2.

F. *Modified guarding arrangement*

Figures 4, 5:
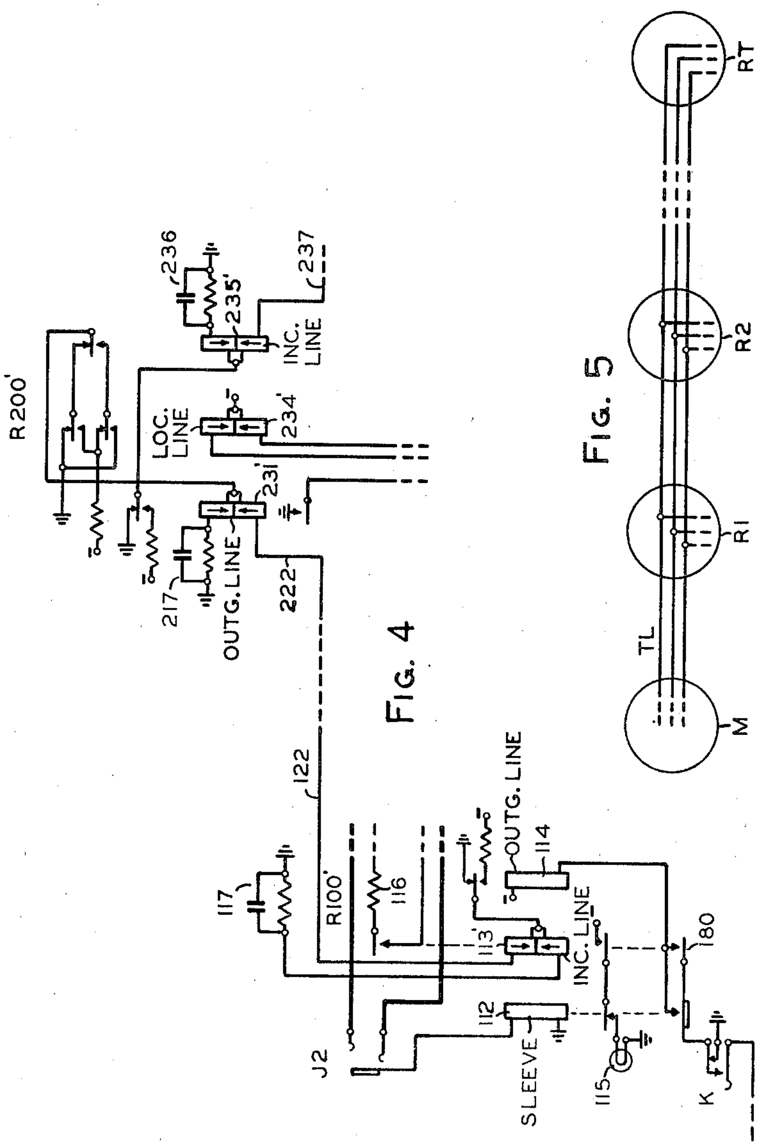

Fig. 4 shows a modified arrangement for guarding the common trunk line TL of Figs. 1 to 3 against seizure at the remaining rural exchanges responsive to seizure at any one of them. In the arrangement of Figs. 1 to 3, it will be recalled that transmitting a spacing signal over the outward channel from the main exchange causes release relays 242 and 342 to operate to guard branches 249 and 349 in each of the rural exchanges. It will be recalled further that seizure of the common trunk line in any rural exchange signals the main-exchange operator over the inward telegraph channel, and operates to guard the seized trunk line against seizure in each of the other rural exchanges. This guarding provision for use in the repeater R200 when the common trunk line is seized at a more remote rural exchange includes the lower contacts of incoming line relay 235 for operating relay 241 to thereby operate release relay 242. On a seizure of the common trunk line at rural intermediate exchange R1, local line relay 234 operates to signal the main exchange operator at its upper armature and front contact, and operates at its inner armature and front contact to transmit a signal over the outgoing telegraph channel to cause the common trunk line to be guarded at the rural exchanges more distant from the main exchange.

In the arrangement shown in Fig. 4, the repeater R100′ at the main exchange is arranged to respond to the operator's calling signal over the incoming telegraph channel to transmit a signal back to all the rural exchanges over the outgoing telegraph channel to thereby guard the seized common trunk line in each.

The repeater R100′ of Fig. 4 is exactly similar to the repeater R100, except that incoming line relay 113′ has an added armature 180 for operating outgoing line relay 114.

The intermediate telegraph repeater R200′ of Fig. 4 corresponds generally to repeater R200 of Fig. 2, but outgoing repeating relay 232 and outgoing hold relay 233 of the latter repeater are omitted. Additionally, outgoing line relay 231′ is arranged to control the outward telegraph channel and the local signal branch directly, while local line relay 234′ and incoming line relay 235′ have no function except to exercise joint control over the next succeeding inward section of the telegraph line, as described hereinbefore for the middle and upper armatures of relay 234, and the upper armature of relay 235.

In order to describe further the modified arrangement of Fig. 4, it may be assumed that the repeater R100′ is substituted in the arrangement of Figs. 1 to 3 for the repeater R100, and that the repeater R200′ of Fig. 4 is substituted for repeater R200 at each rural intermediate exchange. Repeater R300 at the rural terminating exchange remains unaltered.

Seizure of the associated common trunk line at the main exchange, through jack J2, causes sleeve relay 112 to operate outgoing line relay 114 as hereinbefore described. The consequent transmission of a negative spacing telegraph signal over telegraph legs 122 and 222 in series causes outgoing line relay 231′ to operate. At its lower contacts, relay 231′ operates line relay 241, which in turn operates release relay 242 to guard branch 249 against seizure.

Outgoing line relay 231, at its upper armature, repeats the spacing potential to the next succeeding section of the telegraph line, with the result that similar operations occur in the next succeeding exchange to guard the common trunk line thereat and to repeat the spacing signal to the next rural exchange.

When the repeated spacing signal reaches the terminating exchange of Fig 3, relays 331, 341, and 342 operate as previously described, and relay 342 guards the trunk line against seizure.

With the modified repeaters R100′ and R200′ of Fig. 4 substituted as hereinbefore assumed, seizure of the common trunk line at rural exchange R1 results in the operation of local line relay 234′, Fig. 4, as hereinbefore described for local line relay 234, resulting in the transmission of a spacing signal inwardly over conductors 222 and 122 to operate incoming line relay 113′. In addition to lighting line lamp 115 as a call signal, relay 113′, at its armature 180 and front contact, operates outgoing line relay 114 thereby causing the associated common trunk line to be guarded against seizure in each of the rural exchanges as above described.

When the common trunk line is seized in the rural terminating exchange RT of Fig. 3, local line relay 334 operates as previously described to transmit a spacing signal over the inward telegraph channel. This spacing signal is repeated at the intervening exchanges to reach the substituted repeater R200′ in the rural intermediate exchange R1. Incoming line relay 235′ thereupon operates to repeat the spacing signal to the main exchange. Relay 113′ accordingly operates as described to light line lamp 115 and to operate outgoing relay 114 to cause the seized trunk line to be guarded in each of the rural exchanges, as well as to prepare the apparatus in each rural exchange for the receipt of impulse series for controlling the switching apparatus.

I claim:

1. In a multi-exchange telephone system, a two-way trunk line extending in common between a first exchange and a plurality of other exchanges, means in any said exchange for taking the common trunk line for use, and means responsive thereto for marking the trunk line busy in each other said exchange, the last-named means including two mutually independent telegraph channels and means for signalling over one or over both depending upon the exchange at which the common trunk line is taken for use.

2. In a multi-exchange telephone system, a two-way trunk line extending in common between a main exchange and a plurality of subordinate exchanges, the trunk line including a talking channel and two telegraph channels respectively outgoing from and incoming to the main exchange, means in each said exchange for taking the common trunk line for use, a calling signal in the main exchange, means in each subordinate exchange for marking the trunk line busy thereat, means responsive to the trunk line being taken for use in the main exchange for controlling the said busy-marking means in each subordinate exchange over the outgoing telegraph channel, and means responsive to the trunk line being taken for use in any subordinate exchange for controlling said calling signal over the incoming telegraph channel.

3. In a multi-exchange telephone system, a two-way trunk line extending in common between a main exchange and a plurality of subordinate exchanges, the trunk line including a talking channel and two telegraph channels, respectively outgoing from and incoming to the main exchange, means in any said exchange for taking the common trunk line for use, a calling signal in the main exchange, means in each subordinate exchange for marking the trunk line busy thereat, means responsive to the trunk line being taken for use in the main exchange for controlling the said busy-marking means in each subordinate exchange over the outgoing telegraph channel, means responsive to the trunk line being taken for use in any subordinate exchange for controlling said calling signal over the incoming telegraph channel, and means in at least one subordinate exchange for controlling said busy-marking means thereat over the incoming telegraph channel responsive to seizure of the common trunk line at another subordinate exchange.

4. In a multi-exchange telephone system, a two-way trunk line extending in common between a main exchange and a plurality of subordinate exchanges, the trunk line including a talking channel and two telegraph channels respectively outgoing from and incoming to the main exchange, means in any said exchange for taking the common trunk line for use, a calling signal in the main exchange, means in each subordinate exchange for marking the trunk line busy thereat, means responsive to the trunk line being taken for use in the main exchange for controlling the said busy marking means in each subordinate exchange over the outgoing telegraph channel, means responsive to the trunk line being taken for use in any subordinate exchange for controlling said calling signal over the incoming telegraph channel, and means in at least one subordinate exchange responsive to the trunk line being taken for use therein for controlling the busy-marking means in at least one other subordinate exchange over the outgoing telegraph channel.

5. In a multi-exchange telephone system, a two-way trunk line extending from a main exchange to a terminating subordinate exchange by way of at least one intermediate subordinate exchange, the trunk line including a talking channel and two telegraph channels respectively outgoing from and incoming to the main exchange, means in any said exchange for taking the trunk line for use, a calling signal in the main exchange, means in each subordinate exchange for marking the trunk line busy thereat, means responsive to the trunk being taken for use in the main exchange for controlling the said busy-marking means in each subordinate exchange over the outgoing telegraph channel, means responsive to the trunk line being taken for use in any subordinate exchange for controlling said calling signal over the incoming telegraph channel, and for controlling the busy-marking means in any succeeding subordinate exchanges over the outgoing telegraph channel, and means in said intermediate exchange placing the busy-marking means thereat also under the control of the incoming telegraph channel.

6. In a multi-exchange telephone system, a two-way trunk line extending in common between a main exchange and a plurality of subordinate exchanges, the trunk line including a talking channel and two telegraph channels respectively outgoing from and incoming to the main exchange, means in any said exchange for taking the common trunk line for use, a calling signal in the main exchange, means in each subordinate exchange for marking the trunk line busy thereat, means responsive to the trunk line being taken for use in the main exchange for controlling the said busy marking means in each subordinate exchange over the outgoing telegraph channel, means responsive to the trunk line being taken for use in any subordinate exchange for controlling said calling signal over the incoming telegraph channel, and means also controlled over the incoming telegraph channel for controlling the busy-marking means in each subordinate exchange over the outgoing channel.

7. In a multi-exchange telephone system, a trunk line extending between a first exchange and a second exchange, an operator's switchboard in the first exchange, means in the second exchange for connecting a calling line to the operator's switchboard by way of said trunk line and for applying a quiescent supervisory condition thereto, means controlled over the trunk line for the operator's switchboard for extending a connection from said calling line to a called line, means in the second exchange responsive thereto for substituting an active supervisory condition for the quiescent one, means responsive to answering on the called line for restoring the quiescent supervisory condition to the trunk line during conversation, means controlled from the calling line after said connection has been extended to the called line for substituting the currently unapplied one of said supervisory conditions for the applied one, and operator's supervisory means controlled according to whether said quiescent or said active supervisory condition is applied to the trunk line.

8. In a multi-exchange telephone system, a trunk line extending between a first exchange and a second exchange, an operator's switchboard in the first exchange including means for making connection with the trunk line, means in the second exchange for connecting a calling line to the operator's switchboard by way of said trunk line and for applying a quiescent supervisory condition, means controlled over the trunk line from the operator's switchboard for extending a connection from said calling line to a called line, means in the second exchange responsive thereto for substituting an active supervisory condition for the quiescent one, means responsive to answering on the called line for restoring said quiescent supervisory condition during conversation, means controlled from the calling line at any time said connection exists therefrom to the first exchange and to the called line for temporarily reversing said supervisory conditions, and operator's supervisory means controlled according to whether a quiescent or an active supervisory condition is applied to the trunk line.

9. In a multi-exchange telephone system, a trunk line extending between a first exchange and a plurality of other exchanges, an operator's switchboard in the first exchange, means in any said other exchange for connecting a calling line thereof to the operator's switchboard by way of said trunk line and for applying a quiescent supervisory condition thereto, means controlled over the trunk line from the operator's switchboard for extending a connection from any said calling line to a called line, means in the exchange containing the calling line responsive thereto for substituting an active supervisory condition for the quiescent one, means responsive to answering on the called line for restoring the quiescent supervisory condition to the trunk line during conversation, and operator's supervisory means controlled according to whether said quiescent or said active supervisory condition is applied to the trunk line.

10. In a multi-exchange telephone system, a trunk line extending between a first exchange and a second exchange, an operator's switchboard in the first exchange, means in the second exchange for connecting a calling line to the operator's switchboard by way of said trunk line and for applying two supervisory conditions alternatively to said trunk line depending upon whether the hookswitch contacts on the calling line are open or are closed, means controlled over the trunk line from the operator's switchboard for extending a connection from said calling line to a called line, means in the second exchange responsive thereto for transferring the control over said supervisory conditions to the called line, and means thereupon rendered effective for temporarily reversing said supervisory conditions responsive to an opening of the calling line, and operator's supervisory means controlled according to whether said quiescent or said active supervisory condition is applied to the trunk line.

11. In a multi-exchange telephone system, a trunk line extending between a first exchange and a second exchange, an operator's switchboard in the first exchange, means in the second exchange for connecting a calling line to the operator's switchboard by way of said trunk line, means for applying a quiescent supervisory condition and an active supervisory condition alternatively to said trunk line, means controlled by the hookswitch on the calling line for determining which of said supervisory conditions is current applied, means controlled over the trunk line from the operator's switchboard for extending a connection from said calling line to a called line, means in the second exchange responsive thereto for placing the determination of said supervisory conditions under the joint control of the hookswitches on the calling and called lines, and operator's supervisory means controlled according to whether said quiescent or said active supervisory condition is applied to the trunk line.

12. In a multi-exchange telephone system, a trunk line extending from a first exchange to distant exchange apparatus, an operator's switchboard in the first exchange from which said trunk line extends, means included in said distant exchange apparatus for connecting a first line and a second line successively to said trunk line, means controlled by the hookswitch on the first line prior to the connecting of the second line to the trunk line for placing a quiescent and an active supervisory condition alternatively on said trunk line, means controlled jointly by the hookswitches on the two lines for placing said supervisory conditions alternatively on the trunk line after the second line is connected thereto, and operator's supervisory means at said switchboard controlled according to whether said quiescent or said active supervisory condition is applied to the trunk line.

13. In a multi-exchange telephone system, a trunk line extending from a control exchange to a series of succeeding controlled exchanges, means in each said exchange for connecting a line thereof to said trunk line to place a pair of such lines in mutual telephonic communication, local supervisory relays in said controlled exchanges respectively, means for controlling each said relay through the hookswitch of a line of the corresponding exchange which may be currently connected to said trunk line, means rendering each said relay effective to transmit two supervisory conditions alternatively to the next preceding exchange, a repeating supervisory relay in each controlled exchange except the last for repeating said supervisory conditions to the next preceding exchange, the foregoing means including means enabling any said repeating supervisory relay and the associated local supervisory relay to determine jointly which of the two alternative supervisory conditions is to be transmitted to the next preceding exchange, and supervisory means in the said control exchange selectively responsive to said supervisory conditions.

BERT A. WALLACE.

REFERENCES CITED

The following references are of record in the file of this patent:

UNITED STATES PATENTS

| Number | Name | Date |
|---|---|---|
| 1,646,387 | Preuss | Oct. 25, 1927 |
| 1,848,196 | Polinkowsky et al. | Mar. 8, 1932 |

FOREIGN PATENTS

| Number | Country | Date |
|---|---|---|
| 489,545 | Great Britain | July 25, 1938 |

OTHER REFERENCES

"Automatic Telephony," second edition, by Smith and Campbell, published by McGraw-Hill Book Co.